Aug. 25, 1942.  G. O. WERNER  2,293,784
LENS SHUTTER-PHOTOFLASHLIGHT SYNCHRONIZATION MECHANISM
Filed July 2, 1940   2 Sheets-Sheet 1
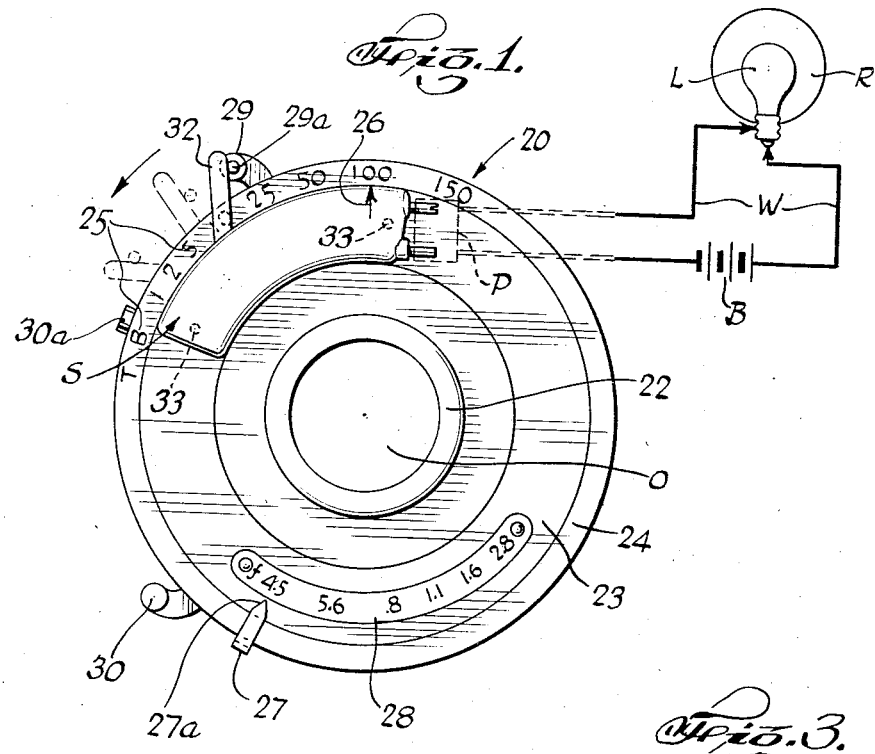
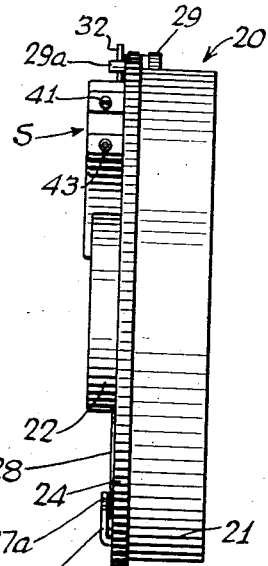
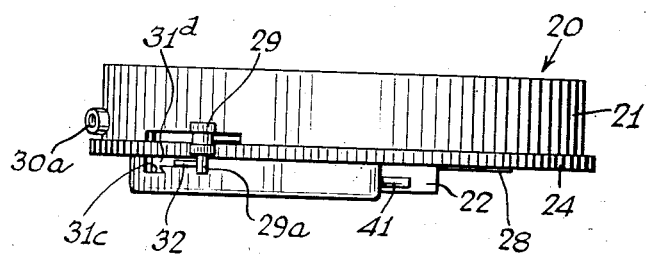
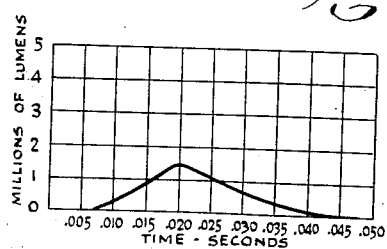
INVENTOR
GEORG OTTO WERNER
BY Louis Barnett
ATTORNEY

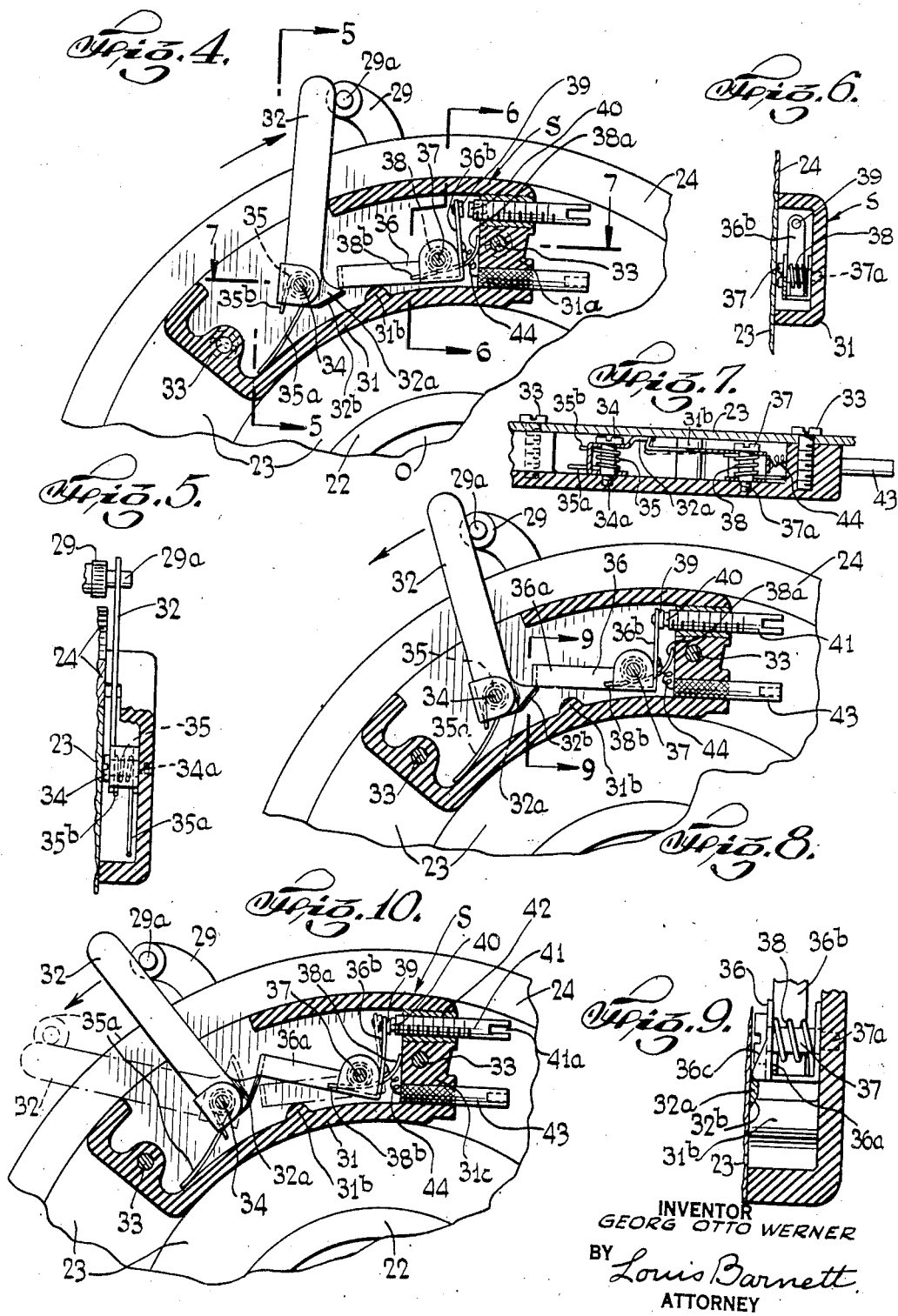

Patented Aug. 25, 1942

2,293,784

UNITED STATES PATENT OFFICE 2,293,784

LENS SHUTTER-PHOTOFLASHLIGHT SYNCHRONIZATION MECHANISM

Georg Otto Werner, Astoria, N. Y.

Application July 2, 1940, Serial No. 343,512

8 Claims. (Cl. 67—29)

This invention relates to flashlight photography and more particularly is directed to a lens shutter-flashlight mechanism for the synchronization of the opening period of a lens shutter with the production of a flashlight, as for example by closing of an electric circuit for setting off a photoflash lamp or powder.

Among the objects of the invention is to generally improve synchronization mechanisms of the character described which shall comprise few and simple parts assembled to form a neat appearing, compact, rugged structure; which shall be relatively cheap to manufacture, easy to install and adjust for the predetermined synchronization; which shall retain such synchronization adjustment even when a camera constructed to embody the invention is roughly handled; which shall be simple to operate even by those unskilled; which mechanism shall be readily put in and out of effective operation as desired without interfering with operation of other working parts of the camera; and which shall be practical and efficient to a high degree in use.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawings in which is shown one of the possible illustrative embodiments of this invention, Fig. 1 is a front elevational view of a camera lens mounting with a "Compur" type of between-the-lens-shutter and photoflashlight synchronization mechanism constructed to embody the invention showing the connecting electric circuit diagrammatically;

Figs. 2 and 3 are top plan and side elevational views, respectively, of the improved camera lens mounting shown in Fig. 1;

Fig. 4 is a fragmentary front elevational view of the shutter and synchronization mechanism parts showing portions thereof broken away to expose the interior construction with the finger operated priming lever of the shutter opening control in an initial position ready to be released;

Figs. 5, 6 and 7 are cross-sectional views taken on lines 5—5, 6—6 and 7—7, respectively, in Fig. 4;

Fig. 8 is a view similar to Fig. 4 except that the shutter and synchronization mechanism parts shown with the priming lever moved from the initial position to an advanced position just before the lens shutter is open, the switch of the flashlight electric circuit being momentarily closed for setting off the photoflash lamp L;

Fig. 9 is a fragmentary cross-sectional view taken on line 9—9 in Fig. 8;

Fig. 10 is a view similar to Fig. 8 except the shutter and synchronization mechanism parts shown when the priming lever is further advanced ready to trip the switch for opening the flashlight circuit, the dotted line position showing the parts in fully advanced position and the switch open; and Fig. 11 is a graph or chart showing the characteristics of one conventional type of synchrophotoflash lamp L adapted to be used in practising the invention.

Referring in detail to the drawings 20 denotes a camera lens mounting with a between-the-lens-shutter of the improved "Compur" type constructed for synchronization of the opening period of the lens shutter with the closing of an electric circuit (shown diagrammatically in Fig. 1) for setting off a photoflash lamp L or other flashlight producing means.

B in said diagram, Fig. 1, indicates the battery, R a reflector for the lamp L, W conventional lead wires connecting the various parts of the circuit, and P a connecting receptacle plug of conventional type for connecting said battery B, lamp L and lead wires W to the synchronizing mechanism carried by the shutter casing 21. Said battery B, reflector R, lamp L and plug P each may be of any conventional well known construction, the conductor wires W preferably being flexible and of sufficient length to permit mounting the battery B, reflector R and lamp L in a suitable convenient position with respect to the camera lens in the well understood manner. The receptacle plug P permits ready detachment of the above mentioned circuit parts to facilitate storage thereof when not in use and for ease and convenience of transportation.

The embodiment of the invention is shown applied to the improved "Compur" type of shutter which includes the casing 21 of circular cross-section housing the operating parts of the shutter which are positioned between the planes of spaced lenses (not shown), the front or exposed lens O being mounted in a bezel 22 which is of smaller diameter than the casing 21 and is located in concentric relation therewith. On the front side of the casing 21 extended beyond the bezel 22, there is provided a front annulus cover plate 23 and mounted for rotation about and substantially flush with said cover plate 23 there is a time adjusting ring 24. Said ring 24 at the top portion thereof is impressed with the usual shutter time setting indicia 25 such as "T," "B," "1," "2," "5," "10," "25," "50," "100," "150," etc., of well understood significance, a fixed marker or stationary arrowhead being provided on the front cover plate 23 cooperating with the indicia 25 to facilitate the reading and setting desired timing of the shutter speed. The ring 24 is connected with the shutter parts inside of the casing 21 to set such parts to correspond with said indicia 25. The timing is easily set by rotating the ring 24 with respect to the upper side of the casing 21.

Located to swing along the lower side of the casing 21 is a finger lever 27 terminating in a pointer 27a extending to travel in front of the lower end of the ring 24 to show the diaphragm opening or stops of the shutter as conventionally indicated on a suitable scale 28, as for example "f," "4.5," "5.6," "8," "11," "16," etc.

Since the casing, lenses and shutter mounting 20 may frequently be mounted on the front bellows end of a folding camera of conventional construction, it is desirable that the embodiment of the invention be small, compact, and of neat appearance as well as rugged. To this end, there is provided an electric switch of novel construction, indicated generally at S, and installed to cooperate with a priming or setting lever 29 which is mounted just behind the ring 24 directly over the indicia 25 for limited swinging or winding of the shutter movement. The usual finger release operating lever or trigger 30 and a cable release connection are provided; the former being mounted for limited oscillating movement behind and extending beyond said ring 24 adjacent the left hand end of the scale 28 as seen in Fig. 1.

Since the detail construction of the "Compur" shutter parts and assembly with the priming lever 29 and the release lever 30 is well known, a description of the operation thereof will be omitted except insofar as such parts are embodied in the practice of the invention herein.

The switch S may include a sector-shaped base member 31 firmly secured to the upper portion of shutter cover plate 23 by suitable fastening means, such as spaced screws 33, extending outward from the rear side of and through the casing cover plate 23, and is threaded into the base member 31 as shown in Figs. 4 and 7. Said switch S also has a spring arm 32 pivoted at the lower end on a screw pin 34 suitable supported as at 34a by said base member 31. The arm 32 extends upwardly and is positioned to be swung on its pivot pin 34 on pressure exerted by the movement of a stud 29a extending horizontally from the priming lever 29 when the latter is released and swings from an initial set or wound up position in a direction for opening of the shutter. The maximum opening of the shutter is indicated in Fig. 1 when the priming lever 29 and pin 29a moving in the direction of the arrow reach the intermediate dotted line position shown. This latter position takes place just after the lever 29 and pin 29a have advanced slightly past that shown in Fig. 8. A second dotted line position at the extreme distance in the direction of the arrow from the full line position shown indicates the complete swinging movement of the priming lever 29.

The arm 32 is actuated by the priming lever stud 29a against the action of a coiled compression spring 35 which has one end 35a thereof supported against the interior wall of the base member 31, the other end 35b of the spring 35 being supported and retained at the lower end of the arm 32 with the coils of the spring 35 encircling the pivot screw pin 34 so that normally the arm 32 is continuously urged to return to its upward extended position against the priming lever stud 29a as shown in full lines in Fig. 1.

Projecting from the lower end of the arm 32 is a cammed tooth or toe 32a which cooperates to actuate a tripper 36, the latter being pivoted on a screw pin 37 which may be suitably supported, as at 37a, on said base member 31. The tripper 36 is retained in a position for cooperating with the toe 32a by the action of another coil compression spring 38. Said spring 38 has one end 38a thereof retained against the inner side wall 31a of the base member 31, the other end 38b of said spring 38 being retained by the end of a horizontal extension 36 forming part of said tripper 36 adjacent the pivot pin 37. The coils of the spring 38 encircle said pivot pin 37 so that under normal conditions the tripper 36 tends to be positioned with the extension 36a lying horizontal and against a stop lug 31b projecting up from the inner side of the base member 31, as is clearly shown in Fig. 4.

Also formed to extend up from the extension 36a as part of the tripper 36 there is provided an upwardly extending spring piece 36b which carries to its free end a switch contact 39, the latter being adapted to make and break the electric circuit by movement to and from a juxtaposition contact 40 terminating the leading end of a terminal 41. Said terminal 41 extends through an end wall 31a of base member 31 and may be adjusted with respect thereto by any suitable means, as for example the provision of a threaded bearing sleeve 42 and a complementary screw thread formed on the terminal 41 as is shown in Figs. 4, 8 and 10. The end of the terminal 41 which extends beyond the base member 31 may be slotted as at 41a to facilitate screwing the terminal 41 for adjusting the same in and out of its threaded bearing sleeve 42.

Spaced from the terminal 41 and in alignment therewith is a second terminal 43 which also extends through the wall 31a and may be fixedly secured therein. A current carrying jumper or other like flexible electrical connecting means 44 interconnects the inner end of said terminal 43 with the spring piece 36b and contact 39 thus bringing the latter into the electric circuit as is clear from Figs. 1, 4, 8 and 10.

Fig. 11 shows a graph or chart of the timelight characteristics of one of the commercial types of synchro-photoflash lamps. This shows that the peak of light is reached 20 milli-seconds after the current has been applied to the lamp L. The duration of the period of available peak of the light takes place from 15 milli-seconds to 26 milli-seconds after the current has been applied. It is for this part of the peak that the synchronizing adjustment of the mechanism 20 is made when it is desired to take a photograph with the time setting of $1/100$ of a second in the manner to be hereinafter described.

From the drawings and the above description the practical application of the invention is apparent. After the parts are made and assembled on the base member 31 as shown in Figs. 4, 5, 6 and 7, the annular cover plate 23 is removed from the shutter casing 21 and the assembly is firmly mounted by means of the screws 33 or the like so that the cover plate 23 with the assembly as a unit is then put back in place. The arm 32 is positioned in abutment against the stud 29a extending from the priming lever 29. When the latter is in wound-up initial effective position, the parts of the switch S will be as shown in Fig. 4.

The switch S is adjusted for a desired synchronization when the time is less than 1/50 of a second so that the circuit closes before the shutter starts opening to conform to the tag lag indicated on the characteristic chart of the lamp L shown in Fig. 11. The adjustment is made by screwing the terminal screw 41 so as to bring the contacts 41 and 39 together momentarily before the shutter opens and sufficient time is allowed to bring the peak of the flash, i. e. the portion of the curve in Fig. 11 from between "015" and ".025" time-second marks within the range of the 1/100 second of shutter opening.

A flashlight photograph may be taken in the well understood manner, as for example with the stop set by pointer 27a at "f 4.5" on scale 28 and the timing set when the arrow 26 on the exterior surface of the base member 31 aligns with "100" on indicia 25 denoting 1/100 second, the electric circuit of the switch S being connected in through terminals 41 and 43 by receptacle plug P, all as shown in Fig. 1. Now, on depressing the finger lever 30, the priming lever 29 with the stud 29a is released to move in the direction of the arrow swinging the arm 32 on pivot screw 34. A momentary closing of the circuit takes place when contacts 40 and 39 come into abutment, that is, when the priming lever 29 and arm 32 reach approximately the position shown in Fig. 8. Further advance of the priming lever 29 spring presses said contacts 40 and 39 together and the toe 32a then slides from under the end of the extension 36a, as shown in full lines in Fig. 10, thereby permitting the return of said tripper 36 to the position against the stop lug 31b again separating the contacts 40 and 39 for opening the circuit as shown in dotted lines in Fig. 10. The spring 38 is effective to produce the above described return movement. The priming lever 29 and arm 32 then complete their travel without further affecting the switch parts and the picture is taken by synchro-flashlight. The lamp L being blown, it is replaced ready for another exposure.

The invention contemplates permitting the replacement of the lamp L either before or after the priming lever 29 has been reset, that is, at any time whether said lever 29 is in its initial effective position or when being moved from the extreme dotted line position to the full line position shown in Fig. 1. To this end as shown in Fig. 9 the toe 32a is provided with a cam portion 32b which on the return movement of the arm 32 with the priming lever 29 to its initial effective position slides along cam surface 36c on extension 36a behind, past and under the tripper extension 36a without otherwise disturbing the tripper 36 and permitting the contacts 40 and 39 to stay separated and retained in open circuit, thus making the operation "foolproof" and preventing the accidental flash of the lamp L during the resetting of priming lever 29.

If desired, a notch 31c in slot 31d may be provided out of the path of movement of the arm 32 in the base plate 31, said arm 32 moving in said slot 31d. The notch 31c is preferably located at the extreme end of said slot 31d as shown in Fig. 2 and is utilized to spring the arm 32 therein, thus making the switch S ineffective by removing all the parts thereof from engagement or actuation of the operating parts of the shutter. The base member 31 preferably is of insulating material and since the casing cover plate 23 is of similar material, the shutter parts are completely shielded from the electric circuit, thus eliminating all possible injury to the shutter due to the passage of electric currents or arcing in making or breaking the circuit.

The base plate 31 with the assembled parts as above described are not only neat and compact lending themselves to ready installation in folding cameras without detracting from the appearance thereof, but is sufficiently small not to interfere with opening up and closing of the camera, and is of such simple and rugged construction as to withstand rough handling and yet retain a desired synchronization adjustment.

It is to be understood that the invention is equally applicable for synchronization for all lens shutter speeds, greater or less than that described above and for all kinds of flashlight means including photoflash lamps having characteristics different from that shown in Fig. 11.

It will thus be seen that there is provided means whereby the several objects of this invention are achieved and which are well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In combination with a priming lever of an in-between-lens shutter, a swingable arm pivotably mounted at one end having a free end engaging said lever during the movement thereof for opening the shutter, a toe carried by the arm adjacent pivoted end, a tripper movably mounted in the path of movement of said toe for actuation thereby on swinging of the arm in one direction, said tripper being mounted for movement out of the path of movement of the toe, circuit closing means for momentarily closing a photoflashlight bulb circuit operated by said tripper on movement of said arm and toe in said direction, and camming means carried on said toe for moving said tripper out of said path of movement for leaving the circuit open on said reverse swinging of the toe.

2. A synchronizing mechanism of the character described comprising a camera lens shutter enclosed in a casing, a priming lever for the shutter mechanism extending through said casing, a base member, an arm pivoted at one end to said base member for movement of the other end with an end of said priming lever on the exterior of said casing, a tripper movably supported by the member and actuated by the arm on movement thereof in one direction, circuit control means carried by said member and operated by the tripper for momentarily closing a circuit connecting with a flashlight on actuation of said tripper, cooperating means on the arm and tripper for making the tripper circuit closing action ineffective on movement of the arm in a direction opposite to the first mentioned direction, and means for attaching the base member, arm and tripper as a unit to said shutter casing front side.

3. A synchronizing mechanism of the character described for setting off a photoflashlight bulb comprising a camera lens shutter having a casing, a movable priming lever for said shutter extending through the casing, a base member mounted upon said casing, an arm pivoted at one end to said base member for movement of the other end with an end of said priming lever, a toe adjacent the pivoted end, a tripper mounted to be engaged by said toe on swinging of said arm and toe in one direction adapted to close the photoflashlight circuit momentarily, said tripper being so constructed and arranged to flex out of the path of movement of the toe on swinging of the latter in the reverse movement to said direction to maintain the switch open, and means carried by said toe for flexing said tripper out of the path of the toe.

4. In a synchronization mechanism of the character described a camera lens shutter having a priming lever in combination with a switch for setting off a photoflashlight bulb comprising a swingable arm pivoted at one end and having the other end engaging with said priming lever, a toe carried by the arm for movement therewith, a tripper movably mounted in the path of movement of said toe for actuation thereby on swinging of the arm in one direction, a circuit closing means for momentarily flashing said bulb operated by said tripper on movement of said arm and toe in said first mentioned direction, and camming means on the toe for moving said tripper out of said path of movement of said toe to leave the switch open circuited on swing of the arm in a direction reverse to the first mentioned direction.

5. A synchronizing mechanism of the character described comprising a camera lens shutter enclosed in a casing, a priming lever for the shutter mechanism extending through said casing, a base member, an arm pivoted at one end to said base member for movement of the other end with an end of said priming lever on the exterior of said casing, a tripper movably supported by the member and actuated by the arm on movement thereof in one direction, circuit control means carried by said member and operated by the tripper for momentarily closing a circuit connecting with a flashlight on actuation of said tripper, cooperating means on the arm and tripper for making the tripper circuit closing action ineffective on movement of the arm in a direction opposite to the first mentioned direction, and a detent provided on said base member for retaining the arm when flexed out of the path of movement of said lever to render the circuit control means inoperative.

6. The synchronizing mechanism defined in claim 3 in which said shutter casing includes a front removable cover extending over the priming lever; and said base member, arm and toe are mounted as a unit on said front cover.

7. In the synchronizing mechanism defined in claim 4 in which a casing with a front removable cover is provided for housing the lens shutter and a base member for housing said switch, said base member being mounted on said cover.

8. A camera lens shutter having a casing, a movable priming lever for said shutter extending through said casing, in combination with a synchronizing mechanism comprising a base member supported exterior of the shutter casing, an arm pivoted on said base member between the latter and said casing, said arm extending beyond said base member and mounted for movement with said priming lever in one direction, a tripper mounted on said base member for actuation by the arm on movement of the latter in said direction, circuit control means operated by the tripper for momentarily closing a circuit connected with a flashlight, and means carried by said arm coacting with the tripper for making said actuation of the tripper by the arm ineffective on movement of the arm in a direction opposite to the first mentioned direction.

GEORG OTTO WERNER.